United States Patent [19]

Harwood, Jr. et al.

[11] Patent Number: 4,925,631
[45] Date of Patent: May 15, 1990

[54] METHOD OF CASTING A HOPCALITE FILTER AND CAST CERAMIC FIBER-HOPCALITE

[75] Inventors: Van N. Harwood, Jr., Williamsville; Joseph F. Wojtasik, Buffalo, both of N.Y.

[73] Assignee: Figgie International, Inc., Willoughby, Ohio

[21] Appl. No.: 249,414

[22] Filed: Sep. 26, 1988

[51] Int. Cl.⁵ .................. A62B 7/08; B01D 53/04; B01J 27/232; B01J 23/34
[52] U.S. Cl. ..................... 422/122; 55/387; 423/247; 502/174; 502/241; 502/324; 502/400; 502/407; 502/527
[58] Field of Search ............ 502/400, 407, 324, 527, 502/174, 241; 423/247, 241; 55/387, 524, 527, 68; 422/122, 120

[56] References Cited

U.S. PATENT DOCUMENTS

| | | | |
|---|---|---|---|
| 2,837,587 | 6/1958 | Hogan et al. | 260/683.15 |
| 3,150,922 | 9/1964 | Ashley | 23/2 |
| 3,399,973 | 9/1968 | Grosskopf | 23/454 |
| 3,489,693 | 1/1970 | Bovard | 252/475 |
| 3,516,797 | 6/1970 | Bovard et al. | 23/281 |
| 3,536,070 | 10/1970 | Bovard | 28/142.3 |
| 3,536,456 | 10/1970 | Bovard | 23/281 |
| 3,573,001 | 3/1971 | Bovard | 23/281 |
| 3,684,712 | 8/1972 | Bovard | 252/45 |
| 3,691,097 | 9/1972 | Stiles et al. | 502/241 |
| 3,895,912 | 7/1975 | Naumann | 23/255 |
| 3,988,224 | 10/1976 | Barriere et al. | 204/108 |
| 4,054,428 | 10/1977 | Foltz | 55/33 |
| 4,238,460 | 12/1980 | Aiken et al. | 423/210 |
| 4,315,837 | 2/1982 | Rourke et al. | 252/423 |
| 4,451,435 | 5/1984 | Holter et al. | 422/171 |
| 4,500,327 | 2/1985 | Nishino et al. | 55/72 |
| 4,518,704 | 5/1985 | Okabayashi et al. | 502/80 |
| 4,551,304 | 11/1985 | Holter et al. | 55/74 |
| 4,665,050 | 5/1987 | Degen et al. | 502/407 |
| 4,680,040 | 7/1987 | Gooray et al. | 55/387 |
| 4,681,801 | 7/1987 | Eian et al. | 428/283 |
| 4,687,640 | 8/1987 | Schillaci | 422/120 |
| 4,722,766 | 2/1988 | Spring | 423/247 |
| 4,832,926 | 5/1989 | Schillaci | 502/324 |

FOREIGN PATENT DOCUMENTS 105244 6/1982 Japan .................. 502/241

OTHER PUBLICATIONS

Lamb et al.; Contributions From the Chemical Warfare Service, U.S.A., "The Removal of Carbon Monoxide from Air", *Journal of Industrial and Engineering Chemistry*, pp. 213-221. vol. 12, No. 3, Mar. 1920.
The Carborundum Company, ad for Fiberfrax HSA Fiber, Product Specifications, form C733-I, 1981, p. 1 of 1.

*Primary Examiner*—Paul E. Konopka
*Attorney, Agent, or Firm*—Hodgson, Russ, Andrews, Woods & Goodyear

[57] ABSTRACT

A method of making a cast hopcalite filter. The filter is formed by adding to "green" hopcalite a given weight of ceramic fibers. Additional water may also be added as required. This mixture is blended briefly in a high speed blender and then poured into a mold. Water is drained by vacuum through a filter paper in the bottom of the mold, preferably with the aid of a vacuum. The wet preform is then placed in a high temperature (600° F. to 650° F.) oven for approximately 90 minutes for calcining. In this process the basic catalyst material saturates the fiber matrix before drying and transformation into its final chemical state.

9 Claims, 1 Drawing Sheet

U.S. Patent     May 15, 1990     4,925,631
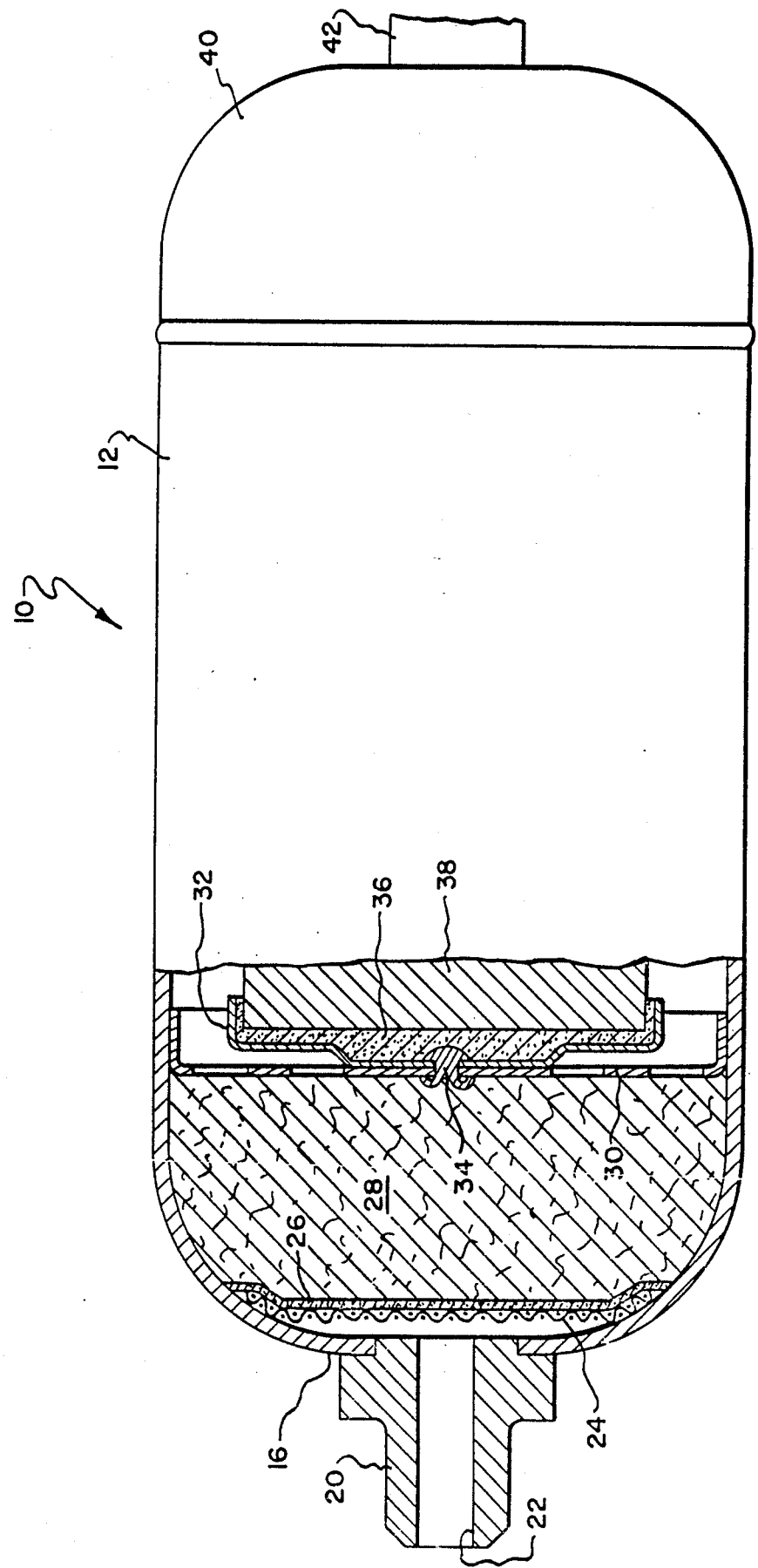

METHOD OF CASTING A HOPCALITE FILTER AND CAST CERAMIC FIBER-HOPCALITE

FIELD OF THE INVENTION

The present invention relates to a method of making a filter capable of filtering gases, and more specifically to the method of making a cast hopcalite filter.

BACKGROUND OF THE INVENTION

In various applications it is desirable to remove carbon monoxide from gases and this is typically achieved by passing the gases through a hopcalite filter bed. Hopcalite is a specially prepared filtering material made of a miture of copper and manganese oxides, which filtering material functions as a room temperature catalyst to promote oxidation of carbon monoxide to carbon dioxide.

In processes currently used to produce hopcalite filtering materials suitable chemicals are allowed to react in solution to form the active ingredients which precipitate out as a sludge. This product is then rinsed, dried and pressed to form a block. The product is then crushed and sieved. Prior to calcining the product is known as "green" hopcalite. The sieved product, which typically passes through a 6 mesh screen but not through a 14 mesh screen, is calcined for several hours in a hot oven. Calcining transforms the product to its final form. The resultant product is then assembled into a filter bed with appropriate screens and/or other containment to prevent it with spilling or being settled by vibration. While the filter bed made by this process performs in a very satisfactory manner it requires a tedious assembly process.

Another process for forming a hopcalite filter pad is to mix ceramic fibers and hopcalite dust so that the lightweight dust particles are loosely supported by the fibers. The hopcalite dust is typically that product which will pass through a 100 mesh screen. The resultant fiber and dust mixture are also supported within a filter canister by layering the fiber and hopcalite dust mixture between screens or filter pads. While the hopcalite filter pad utilizing hopcalite dust has the advantage in that it is lighter and uses less material for the volume used, this hopcalite filter construction does not perform as well as the pure hopcalite filter construction of comparable volume, and also this form is somewhat difficult to assemble.

OBJECTS AND SUMMARY OF THE INVENTION

It is an object of the present invention to provide a method for manufacturing a completely preformed hopcalite filter which does not require tedious assembly in its canister and also so that it can be tested and stocked as an independent item.

A cast hoptcalite filter is formed in accordance with the present invention by adding to "green" hopcalite a given weight of ceramic fibers and water. This is blended briefly in a high speed blender and then poured into a filter vessel or mold of proper cross sectional shape and size to form the finished filter for proper fit into its end use container. The water is drained through a filter paper in the bottom of the filter vessel, preferably with the aid of a vacuu. In one embodiment the end of the vessel is then removed so that the resultant "green" hopcalite and fiber preform can be ejected. The wet preform then can be air dried first or directly placed in a high temperature (600° F.-650° F.) oven for calcining. In this process the basic catalyst material saturates the fiber matrix before drying and transofrmation into it final chemical state. As opposed to the filter-making method in which hopcalite dust is mixed with fibers, this method produces, after calcining on the fiber, a mechanical bond to the fiber.

In another embodiment, depending upon container materials and assembly requirements, the cast filter can be formed and calcined in place in its end use container. This saves the steps of ejecting it from the form and reinstalling it into another container. It also protects the cast filter from handling abuse and assures perfect fit. In this application, a filter paper, preferably formed of fiberglass, is utilized in the draining process. This, as well as support screens, are left in the container to be utilized as a final dust filter in the application.

BRIEF DESCRIPTION OF THE DRAWING

The figures in the drawing is a partial cross section of a chemical oxygen generator in which a cast bopcalite filter of this invention is formed in place.

DETAILED DESCRIPTION

In accordance with the principles of the present invention, copper sulfate, manganese sulfate and ammonium bicarbonate are allowed to react in solution to form $CuOC_3Cu(OH)_2$ and $MnCO_3$. These products precipitate out as a sludge. The sludge is then separated from the solution, and rinsed, until the rinse water content is substantially free of sulfate. The resultant product is then drained. The product may then be further dried in an air circulating oven of about 150° F. (65° C.) for about 2 hours if desired. The precipitate products at this point are known as "green" hopcalite. While one well known reaction is set forth above for the production of "green" hopcalite, other reactions may also be used to produce "green" hopcalite. After the rinsing of the "green" hopcalite is completed, a given weight of ceramic fibers is added to make a slurry. Additional water may also be added as required. One form of ceramic fiber which has been found useful in this process is sold by the Carborundum Company under the tradename of FIBERFRAX HSA Fiber. This fiber has a high surface area. A typical analysis of this product is 43.4% $Al_2O_3$, 53.9% $SiO_2$, 0.8% $Fe_2O_3$, 1.6% $TiO_2$, 0.1% $K_2O$ and 0.1% $Na_2O$. The exact amount of ceramic fibers to be added is determined by experimentation, it being necessary to add sufficient fibers so that after the processing is complete that the product will hold together, but not so much that there is a unduly high ratio of fibers to hopcalite. When using a dried "green" hopcalite product, it has been found by experimentation when using the above fibers that a ratio, by weight, of 1 unit of fibers to each 3-4 units of dried hopcalite, will produce a satisfactory end product. This slurry is then blended briefly in a high speed blender. Thus, if only a small quantity of the product was to be manufactured, 300-350 grams of the slurry may be blended for 3 seconds in a high speed blender such as Waring or Oster kitchen blender.

The blended product is now poured into a filter mold or canister of the proper cross sectional shape and size to form the finished cast filter. The canister is initially provided with a filter paper at one end, which filter paper may be supported by a screen. The water within the slurry is then drained through a filter paper in the bottom of the canister, preferably with the aid of a vacuum, until no more water is being discharged from the filter material. Any number of vacuum casting methods can be used to form the filter.

If the filter being formed by the present invention is to be placed in another canister the end of the forming canister or mold is then removed so that the resultant fiber and hopcalite filter preform can be ejected. The filter preform is then calcined by placing it in a (600° F.-650° F.) oven, the product being maintained in the oven for approximately 90 minutes. Before the filter preform is placed in the oven it may be air dried for a suitable length of time such as for example by 24 hours at room temperature. The resultant product can now be tested and stored for future use in its final end product.

As previously indicated the fiber and "green" hopcalite preform may be left in situ in the canister and this form of the invention is illustrated in the drawing. In the particular application shown the final filter product is shown mounted in a chemical oxygen generator indicated generally at 10. The oxygen generator is shown in its final form, the oxygen generator including a housing formed of a cylindrical member 12 provided with an end 16, which housing serves as the canister in which the filter is formed in place. Extending outwardly of the cylinder end 16 is a fitting 20 provided with a bore 22, which bore extends into the interior of the containment vessel. Mounted within the bottom of the cylinder (shown to the left in the drawing) is a screen 24 upon which is supported a particulate filter 26. The blended hopcalite fiber material is poured into the housing, and by applying a vacuum to the outlet 20 water is drawn from the blended fiber and hopcalite material to form the filter indicated at reference numeral 28. After no more water can be drawn from the filter material 28 it is then calcined in an air circulating oven at a high temperature (600°-650° F.) for approximatley 90 minutes. Various components are now installed within the cylindrical section. These components include a perforated plate which is forced into contact with the filtering material 28. At this point it should be noted that the filtering material in its final form is of a resilient consistency and thus full contact can be achieved with the plate 30. A cup 32 is secured by rivet 34 to plate 30. A pad 36 is disposed within the cup 32. A chemical oxygen generator is then assembled onto the pad 36, which chemical oxygen generator may include a chlorate candle 38. Other components are also suitably assembled within the cylindrical section and finally an ignition head 40 is welded thereto, the ignition head being provided with a suitable outwardly extending ignition apparatus 42.

By forming the filter 28 in accordance with the previously described method of this invention a number of advantages over the prior art are achieved. Thus, the time required to assemble the generator filter is substantially reduced. The steps of drying, pressing, grinding, and classifying hopcalite are eliminated. A much shorter calcining time is required. An overall weight savings is accomplished since the filter is more effective on a per unit weight basis. Also, as opposed to a granular hopcalite bed, a large saving in chemical raw materials is achieved due to the reduction in quantity used and the elimination of scrap losses that occur in the processing of granules.

Test samples of the cast filter made by this method as well as other methods are prepared, each testing sample being on axial flow annular filter having a 2¾ inch outer diameter, a 1.7 inch inner diameter and a 1 inch depth. Performance test results are summarized on Table 1.

TABLE 1

| FILTER CONFIG | CATALYST WEIGHT (including fibers) | CHLORINE ABSORPTION | CARBON MONOXIDE OUTPUT (PPM) |
|---|---|---|---|
| PROPOSED | 12.5 gm | 20 cc | 0 |
| MIXED HOPCALITE DUST & FIBERS | 5.5 gm | 10 cc | 430 |
| HOPCALITE GRANULES | 36.0 gm | 10 cc | 0 |
| FILTER MADE BY PROCESS OF U.S. Pat. No. 4,687,640 | 42.0 gm | 35 cc | 375 |

In the first performance test the proposed filter of this invention, a filter prepared from mixed hopcalite dust and fibers, a filter prepared of hopcalite granules, and a filter prepared in accordance with the method disclosed in U.S. Pat. No. 4,687,640 were tested. One performance test measured the effectiveness of carbon monoxide scrubbing. Thus 20 liters per minute of 575 ppm carbon monoxide in air were passed through each test filter for 30 seconds. At the completion of this test the outlet concentration was measured. It was found that the proposed filter design of this invention was very effective in removing carbon monoxide. As chemical oxygen generators frequently discharge chlorine, particularly during the start-up process, a chlorine absorption test was also conducted on the various filters. In accordance with this test procedure air at 20 liters per minute was used to carry the chlorine through the filter, 5 cc of chlorine gas being emptied into the inlet air stream repeatedly at approximately 30 second intervals until chlorine was detected in the outlet stream. It can be seen from Table 1 that the proposed filter of this invention absorbed 20 cc's of chlorine gas before breakthrough was detected. Test results for other filters are also shown in Table 1. It can be seen from the test results that the proposed design was more effective than hopcalite dust mixed with fibers and pure hopcalite alone. From these two performance tests it can be seen that the proposed cast filter performs very effectively.

In addition to the performance tests summarized above, physical integrity testing was also conducted with respect to the proposed cast filter and the fiber/-hopcalite mixture. In these tests filters were subjected to vibration and rinsing with water in an attempt to dislodge and separate the components. In the vibration test, the filter was held in the housing and was placed on a vibrating table which vibrated at 60 hz, 0.06 inches double amplitude. After one hour the housing was disassembled and any loose dust was weighed. In the case of the proposed configuration of this invention less than 0.1 gm of dust was recovered. In the case of the mixture of fiber and hopcalite dust, approximately 8.5% of the catalyst (0.47 gms) separated from the matrix. In the rinsing tests, filters were soaked in water and mixed to form a slurry. The slurry was then filtered to remove the water and the resultant clump of dried material was observed and analyzed with the following results:

1. In the case of the proposed configuration the resultant material was a uniform dark color and no measurable separation was observed.
2. In the case of the mixture of fiber and hopcalite, a distinct separation was observed which left the main mass light in color while the surface of the filter paper was coated with a black sludge. Approximately 25% of the hopcalite dust had separated from the matrix and was trapped in the filter papers.

In order to observe the structure of the proposed material scanning electron microscope photos were made a magnirications up to 7000X. The photos clearly show that a high percentage of the hopcalite has adhered to the fibers and in many cases agglomerated to form a mass completely surrounding the individual fibers.

While a preferred process is described above, it is to be understood that this invention is not to be limited to the particular details described above, but that, in fact, widely differing processes may be employed in the broader aspects of this invention.

What is claimed is:

1. A method of making a cast filter comprising the following steps:
   providing green hopcalite precipitate comprised of $CuCO_3Cu(OH)_2$ and $MnCO_3$;
   adding to the green hopcalite a given weight by percentage of ceramic fibers and water to make up a slurry wherein said fibers are added in an amount sufficient to hold a subsequently molded product together;
   blending the above slurry briefly in a high speed blender;
   introducing the resultant product into a mold of desired cross sectional shape and size to form a cast filter;
   draining the water from the above product; and
   calcining the above product at a temperature of approximately 600°–650° F. for approximately 90 minutes.

2. The method as set forth in claim 1 wherien the drained blended slurry is initially dried by room temperature air prior to calcining.

3. The method as set forth in claim 1 wherein the water is drained from the blended slurry with the aid of a vacuum.

4. The method as set forth in claim 1 wherein the ceramic fibers have a high surface area.

5. The method as set forth in claim 1 wherein the ceramic fibers are formed principally from aluminum and silicon oxides.

6. The method as set forth in claim 1 wherein the mold is the container for the filter and the filter is left in place for calcining and ultimate use.

7. The method as set forth in claim 1 wherein the filter preform is removed from the molds prior to calcining.

8. The cast filter made by the method set forth in claim 6.

9. The cast filter made by the method set forth in claim 7.

* * * * *